United States Patent [19]

Rubin

[11] Patent Number: 5,264,836

[45] Date of Patent: Nov. 23, 1993

[54] THREE DIMENSIONAL CURSOR

[75] Inventor: Steven M. Rubin, Portola Valley, Calif.

[73] Assignee: Apple Computer, Inc., Cupertino, Calif.

[21] Appl. No.: 641,407

[22] Filed: Jan. 15, 1991

[51] Int. Cl.[5] ............................................. G06F 3/033
[52] U.S. Cl. ................................... 345/157; 395/155
[58] Field of Search ..................... 395/119, 120, 152; 340/706–710, 711, 712

[56] References Cited

U.S. PATENT DOCUMENTS 4,835,528 5/1989 Flinchbaugh ..................... 340/709

Primary Examiner—Gary V. Harkcom
Assistant Examiner—Huynh Ba

Attorney, Agent, or Firm—Blakely, Sokoloff, Taylor & Zafman

[57] ABSTRACT

A method for controlling a three dimensional cursor's position on a display with a two dimensional control device by generating a translation signal to the display when the control device was moved in such a way as to indicate that the user intended a translation of the cursor and generating an elevation signal to the display when the control device was moved in such a way as to indicate that the user intended an elevation of the cursor. Analysis of the single movement alone, however, being only the first step in truly interpreting the user's intentions, the present invention also includes steps for preventing certain types of control device movements from being interpreted incorrectly.

13 Claims, 7 Drawing Sheets

Non-perpendicular shadow in perspective view

Path angle

First point computation (presume translation)

Second point computation (presume elevation)

THREE DIMENSIONAL CURSOR

FIELD OF THE INVENTION

The present invention relates generally to display cursors for use with computer software applications, and in particular to a three-dimensional cursor for use with a two-dimensional control device.

BRIEF DESCRIPTION OF PRIOR ART

Many of the computer software applications available on the market today operate in only two dimensions on the computer's display and therefore only require a two-dimensional cursor and control device. But as more software applications are created which operate in three dimensions, there is an ever increasing need to specify three dimensional coordinates for many of the visual objects created by these 3-D applications. Although specialized hardware can and has been built which enables many of these 3-D applications to point in three space, such as three to six degree of freedom control devices, these devices can be expensive, awkward to use, and do little to promote the widespread adoption of 3-D applications. Because most computer users already possess a conventional two dimensional control or pointing device, such as a mouse, utilization of such a standard device to control a three dimensional cursor would reduce the expense associated with purchasing new hardware and the awkwardness of learning to use a new device, and accelerate the adoption of 3-D software applications.

Accordingly, a number of software approaches exist for converting two dimensional mouse points into three dimensional coordinates. The most common method involves tying the mouse coordinates to a particular plane in space. All mouse motion is confined within that plane and a separate set of commands is utilized to move that plane along a perpendicular axis. For example, in one such approach, manipulation of the mouse causes the cursor to move within the X-Y plane while selection of up or down cursor control arrows from a keyboard causes the plane to move along the Z-axis. The different selection buttons of a two button mouse are also often used to control motion along a third axis. A one button mouse would present even greater difficulties if used for this type of approach.

Another software approach to three dimensional pointing is to intelligently attach the cursor to whatever three dimensional object is nearest the cursor. Although this approach works well when selecting points on existing objects, it is not useful when arbitrarily selecting points in space, as would be required to create objects.

SUMMARY OF THE INVENTION

A preferred embodiment of the present invention comprises a method for controlling a three dimensional cursor's position on a display with a two dimensional control device by generating a translation signal to the display when the control device was moved in such a way as to indicate that the user intended a translation of the cursor and generating an elevation signal to the display when the control device was moved in such a way as to indicate that the user intended an elevation of the cursor. Analysis of the single movement alone, however, being only the first step in truly interpreting the user's intentions, the present invention also includes steps for preventing certain types of control device movements from being interpreted incorrectly.

DETAILED DESCRIPTION OF PREFERRED EMBODIMENT

Figure 2:
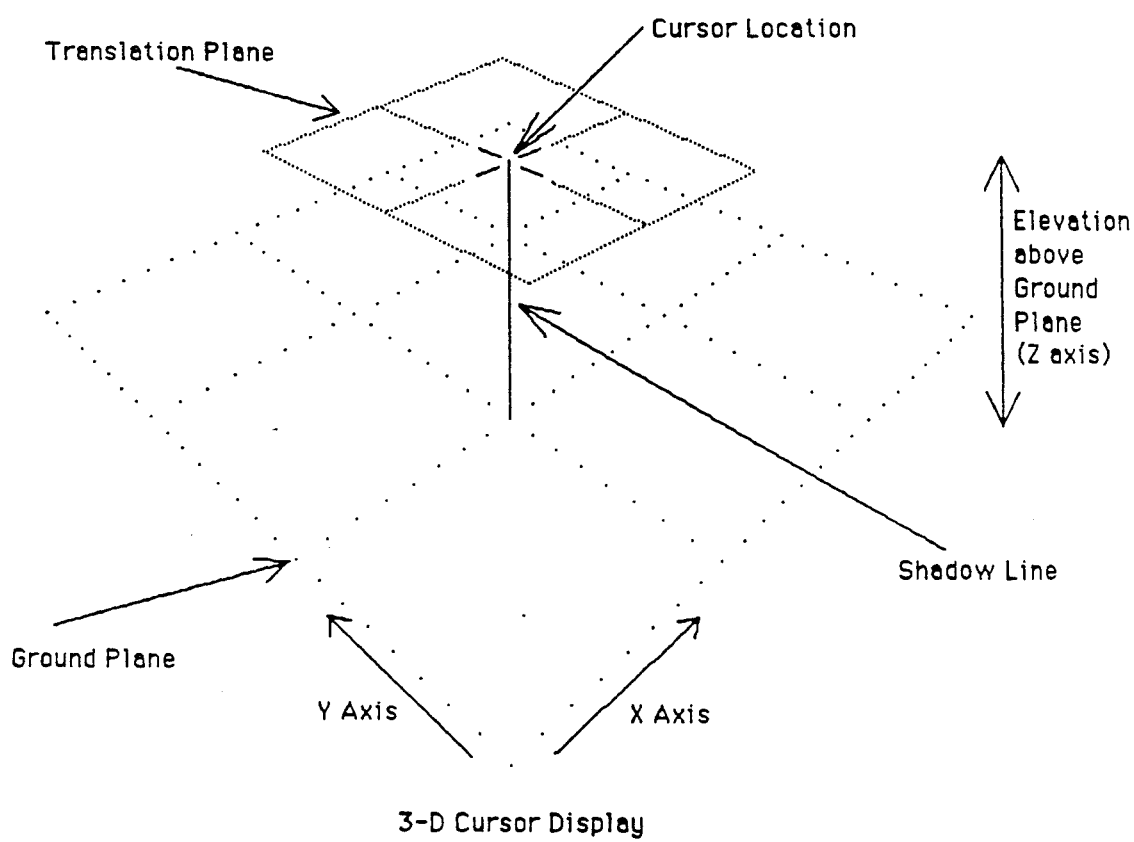
FIG. 2 illustrates the 3-D cursor display, including the translation plane, the cursor location, the shadow line, the ground plane, and X and Y axes.

The three dimensional cursor of the present invention can be readily implemented within a software program (such as a Computer Aided Design (CAD) program) running on any of a number of commercially available computer systems (i.e., a Macintosh computer manufactured by Apple Computer, Inc., of Cupertino, Calif.) which are operative to work with a two axes control device (such as a mouse, trackball, etc.) for manipulating the cursor within the traditional two dimensional space of a display. Since the visual display of the three dimensional cursor can take many different acceptable forms, the preferred embodiment of the present invention centers less on a physical manifestation of the cursor and more on a method for operating some form of that cursor. Although it is anticipated that the cursor could have many different appearances, it is assumed for the purpose of describing the preferred embodiment of the present invention, that the cursor would have a shadow which would extend from the elevated position of the cursor to a ground plane (from which the elevation was initiated) so that the user would know when the cursor was elevating instead of translating within the translation plane when Z does not equal zero (see FIG. 2).

Figure 3:
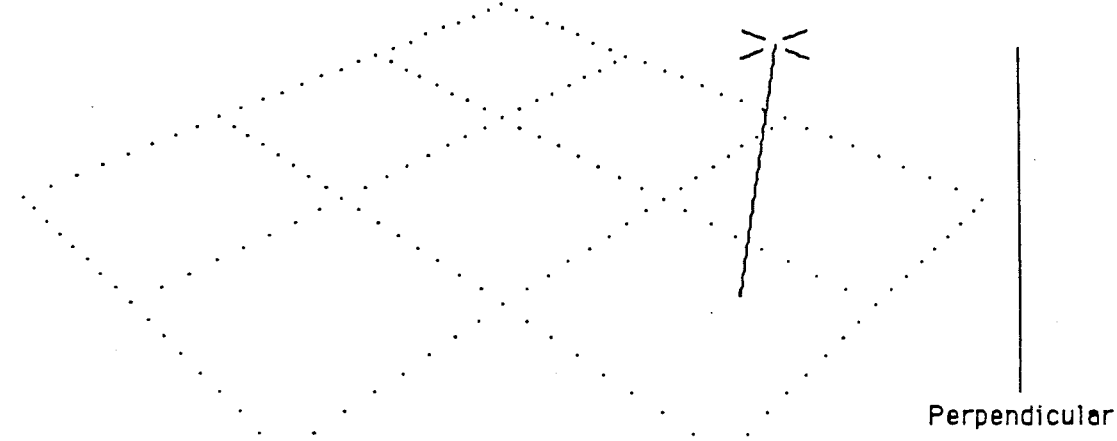
FIG. 3 is the perspective view of a non-perpendicular shadow line.

Normally, this shadow would be visible to the user, although this is not a strict requirement because some other method could be readily devised to alert the user of a cursor elevation. Note that the term "elevating", as used in context with the present invention, refers to either a positive or negative advance along a third axis bisecting the ground planed, which is parallel to the translation plane. The shadow would also normally rise at a 90 degree angle to the ground plane because the shadow is intended to indicate the direction of the Z axis as projected to the display. However, since the shadow passes through the current X-Y position of the cursor, it may at times be non-perpendicular to the true vertical of the display, such as when an object is perspectively viewed on the display (see FIG. 3).

In general, the software approach taken by the present invention is to keep the cursor's motion within a particular translation plane of the display for most manipulations or movements of the mouse, but when the mouse is moved in a substantially vertical direction, the cursor and the translation plane are automatically moved along a third axis (Z axis) perpendicular to the planes. For example, in accordance with the preferred embodiment of the present invention, when isometrically viewing an object, diagonal movement of a mouse from an upper-left to a lower-right corner of a mouse pad would cause the cursor to move along the Y axis; diagonal movement of the mouse from the upper-right to the lower-left corner of the mouse pad would cause the cursor to move along the X axis; and vertical movement of the mouse from the front of the mouse pad to the back causes the cursor to move along the Z axis. Once the elevation is determined to have be discontinued, the translation plane is moved to the newly elevated position of the cursor.

Although this general approach offers a seemingly simple solution for converting two dimensional mouse points into three dimensional coordinates, it presents a number of practical problems which are solved by the preferred embodiment of the present invention. First, in order for this approach to operate properly, it is necessary to transform the two dimensional space in which the mouse travels to the true three dimensional space of the cursor so that all three dimensions of the cursor's motion can be viewed. Hence, the display must be showing a non-orthogonal view of an object in three space, such as an isometric view, a dimetric view, an oblique view, etc., for the three dimensional cursor to be activated.

An additional problem involves ensuring that unintended motions of the mouse do not result in spurious movements of the cursor along an undesired axis. Since it is assumed that a user would most likely want to remain at a given Z position and move about freely in the corresponding X-Y plane without having certain translational motions interpreted as elevations, a certain amount of inertia, or "stickiness", is associated with all mouse motions so that only positively drawn translations are recognized during the elevation mode and only positively drawn elevations are recognized during the translation mode. Hence, if a user is already elevating, stickiness will make it less likely that a mouse motion will be interpreted as a translation instead of an elevation. This same technique can be and is equally applied to movements within the X-Y plane to prevent spurious translational movements from being interpreted as elevations.

Because mouse coordinate values for each control position (advance) of the mouse are generally small in number and must normally be aggregated in order to determine the proper direction of motion, there is another problem associated with determining when to switch the cursor to the elevation mode based on these aggregated values. In the context of the present invention, it is insufficient to look at a collection of the most recent previous mouse coordinates to determine when Z axis motion has occurred because the user may move (translate) to a position, stop, and then resume motion in a new direction (elevate). This problem is resolved by determining which mouse coordinates are intended to be tied together to form one type of motion and only using an aggregate of those coordinates values to define that motion. Still another problem is that a translational curved motion of the mouse may be falsely interpreted as an elevation if it starts and stops along an elevation axis. In such instances, although the individual steps may indicate motion within the translation plane, the aggregate motion will tend to indicate an elevation. To solve this problem, the present invention employs filtering to ensure that the mouse moves in a straight line when elevating.

Figure 1:
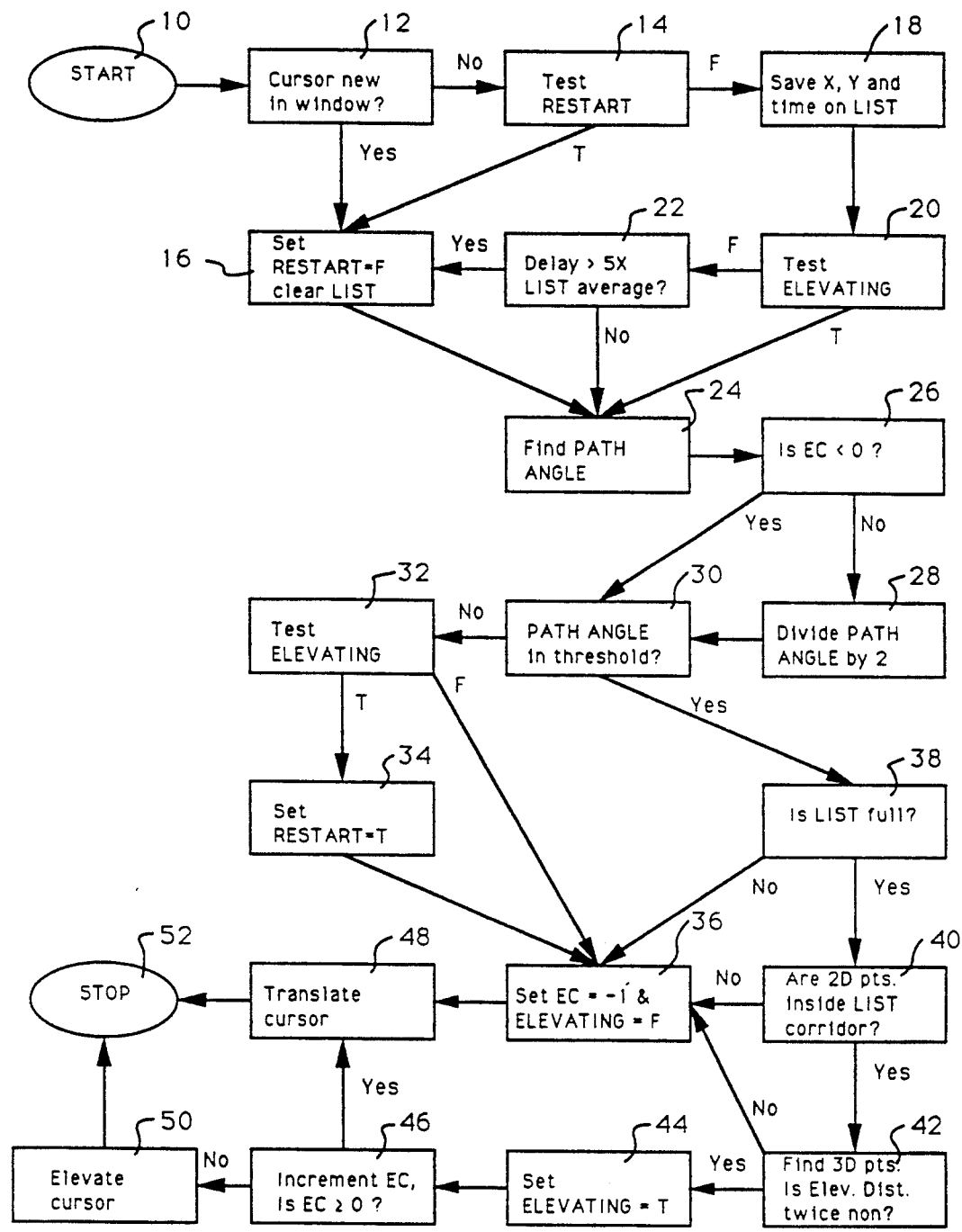
FIG. 1 is a flow chart of a method for operating the three dimensional cursor of the preferred embodiment of the present invention.

The operation of the three dimensional cursor and the manner in which the above problems are resolved are shown in greater detail in FIG. 1. In the preferred embodiment of the present invention, for simplification purposes, it is presumed that the three dimensional coordinates for the cursor remain in a fixed horizontal translation plane, parallel to the ground plane where $Z=0$, unless an elevation occurs, in which case the Z axis coordinate changes. Given these three dimensional coordinates and an advance (manipulation) of the mouse's position, it is possible to derive two alternative interpretations for how the two dimensional motion of the mouse by the user was intended to affect the three dimensional coordinates for the cursor: (1) the mouse advance moves the three dimensional coordinates within the X-Y plane such that a translation and no elevation occurs; or (2) the mouse advance moves the three dimensional coordinates perpendicular to the X-Y plane along the Z axis such that an elevation occurs. Accordingly, the method of the preferred embodiment of the present invention is concerned with determining which interpretation to use.

With reference now to FIG. 1, this method for interpreting the mouse's motion is shown in greater detail. The process illustrated in FIG. 1 is activated and maintained whenever the user selects to view an object on the display in three dimensions. Each advance of the mouse then begins the process starting at START, block 10, and passing through to either elevate block 50 or no elevation block 48, before flowing to and ending at STOP, block 52. This entire process is followed and executed prior to any change in the position of the cursor being projected to the display.

In particular, once an advance of the mouse has been detected by the computer system, the system asks whether this advance would cause the cursor to enter the active window of the display within which the three dimensional cursor would be activated, block 12. This step is an initialization step that will be true whenever the cursor is first activated, or whenever the cursor exits and reenters the active window of the display. If the motion of the cursor is fairly continuous within the active window, this step indicates "NO" and the system moves on to test the RESTART variable, block 14.

The RESTART variable tested in block 14 is a Boolean which is used to indicate whether a LIST of prior two dimensional mouse position coordinates should be supplemented. When RESTART is TRUE, it indicates that the mouse's motion is not, or is no longer considered to be, continuous and that the LIST should be cleared and restarted, block 16. When RESTART is FALSE, it indicates that the mouse's motion is considered to be continuous and that the X and Y coordinates of the present mouse advance, and the time at which that advance occurred, should be saved, block 18. Hence, the LIST is intended to include only those mouse coordinates which should be tied together to form one continuous motion, regardless of whether that motion is a translation or an elevation. The length of this LIST is preferably five advances long, but could be longer or shorter as desired.

Once the X-Y coordinates and time of the mouse advance are saved in block 18, the system moves on to test the ELEVATING variable, block 20, which is another Boolean that indicates whether the three dimensional cursor made an elevation in the last pass through the process. If the previous mouse advance resulted in the cursor remaining in the X-Y plane rather than elevating, the system goes on to test for a delay between the previous mouse advance and the most recent advance of the mouse, block 22. In block 22, the LIST is examined to determine whether this delay is too long for the current advance to be considered as part of a group of advances forming a single motion. To make this determination, the average delay in the LIST is compared with the current delay, and if the current delay is more than five times the average delay, the mouse is considered to have stopped. In such a situation, the LIST would be cleared and RESTART would be set to FALSE, block 16. Thus, when the user's hand rests for a long period of time in one place, the LIST will be cleared to indicate that the mouse has stopped and that subsequent mouse motions should not be aggregated with previous mouse motions. If, however, the cursor has been moving along the Z axis (elevating), it is not necessary to test the LIST for an excessive time delay because arbitrary pauses in hand motion are allowed during elevation.

Figure 4:
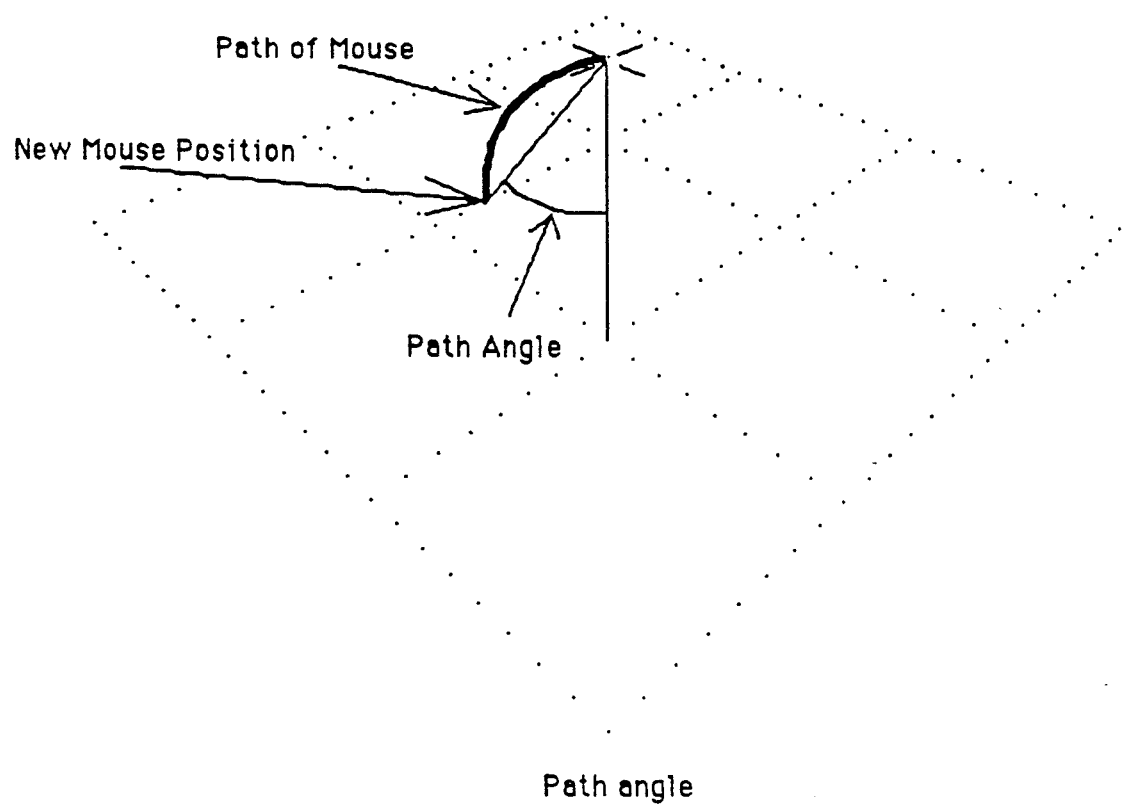
FIG. 4 illustrates the path and path angle of a cursor movement.

Regardless of whether the LIST is cleared, whether the mouse advance was considered to be part of a continuous stroke, or whether the cursor was determined to have been previously elevating, the mouse's PATH ANGLE, as it would be projected on the screen in two dimensions, is determined, block 24. The PATH ANGLE is the angle between a path that would be followed by the cursor in two dimensional screen space if the two dimensional position coordinates for the present mouse advance were used to project that path to the display and the true vertical as it would be projected to the display in two dimensional screen space (see FIG. 4). By comparing this PATH ANGLE to the angle by which the three dimensional cursor's shadow deviates from the true vertical (if it does deviate), as will be further explained below, it is possible to determine whether the current mouse advance is close enough to the path projected by the cursor's shadow for there to be some likelihood of an elevation.

After determining the PATH ANGLE, the ELEVATION COUNT (EC) should be tested, block 26. EC is an integer that counts the number of previous advances that were interpreted as elevations. If the most recent previous advance did not result in an elevation, EC has a negative value. If it is determined in block 26 that the cursor has not previously been elevating, the system proceeds to test the PATH ANGLE, block 30, to determine if it is within the threshold of elevation set by the angle at which the cursor's shadow deviates from true vertical as discussed above. Since the cursor's shadow has a set angle by which it deviates from true vertical, depending on the view selected, this value is predetermined and can be combined with the threshold angle when necessary to maintain a standard level of deviation. Hence, to test the PATH ANGLE, the system measures the degree by which the PATH ANGLE deviates from the cursor's shadow, which for all intensive purposes, is the amount by which the PATH ANGLE deviates from the Z axis. This threshold angle of acceptance is currently set at 15 degrees. If it is determined in block 26 that the cursor has previously been elevating, the allowable PATH ANGLE is divided by two, block 28, to make it easier for the user to keep the cursor elevating once an elevation has been initiated. This divided PATH ANGLE is then tested in block 30 to see if it is within the threshold of elevation.

When the PATH ANGLE is determined to be outside of the threshold established in block 30, the ELEVATING variable is again tested to determine whether the cursor had made an elevation in the last pass through the process, block 32. If the cursor had been elevating, the elevation sequence is considered to have been completed, block 34, and RESTART is set to TRUE to request a new advance that begins where that elevation stopped. If the cursor had not been elevating, EC is reset to $-1$ and the Boolean ELEVATING is set to FALSE, block 36. When the PATH ANGLE is determined to be within the threshold established in block 30, the LIST is examined to determine whether it is full, block 38. If the list is not full (there are fewer than five previous mouse advances), the elevation cannot be verified (the stickiness condition has not been met), so EC is reset to $-1$ and the Boolean ELEVATING is set to FALSE, block 36.

Figure 5:
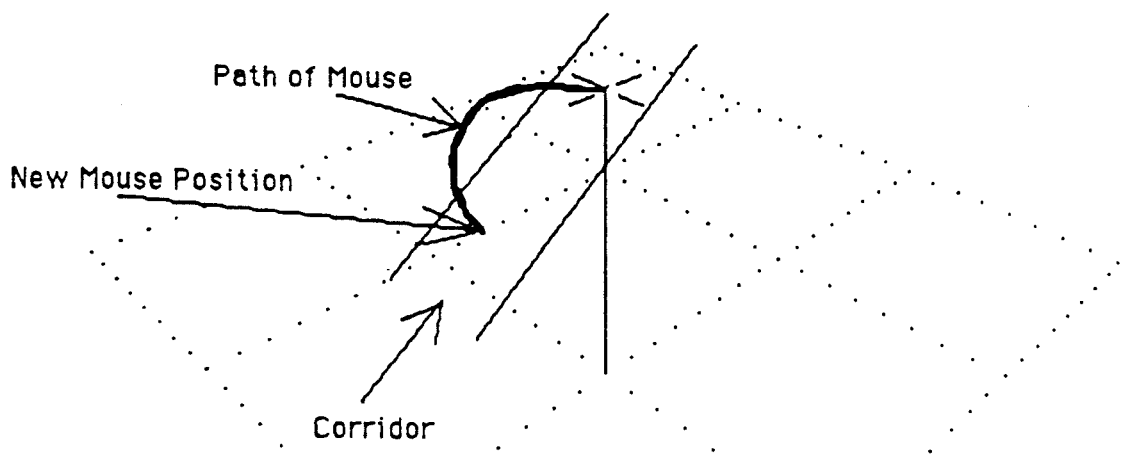
FIG. 5 illustrates the corridor for a cursor movement.

If the LIST is full in block 38, the current mouse advance is tested to see whether it fits in a straight line defined by the LIST, block 40. This is done by constructing a corridor through all of the mouse points on the list and counting the number of points that fall outside of the corridor (see FIG. 5). The width of corridor is preferably set at 10% of its length and 70% of the points must fall inside of this corridor. If these two constraints are not met, the mouse points are presumed to describe a curve rather than a straight line, hence, EC is set to $-1$ and ELEVATING is set to FALSE, block 36.

Figure 6:
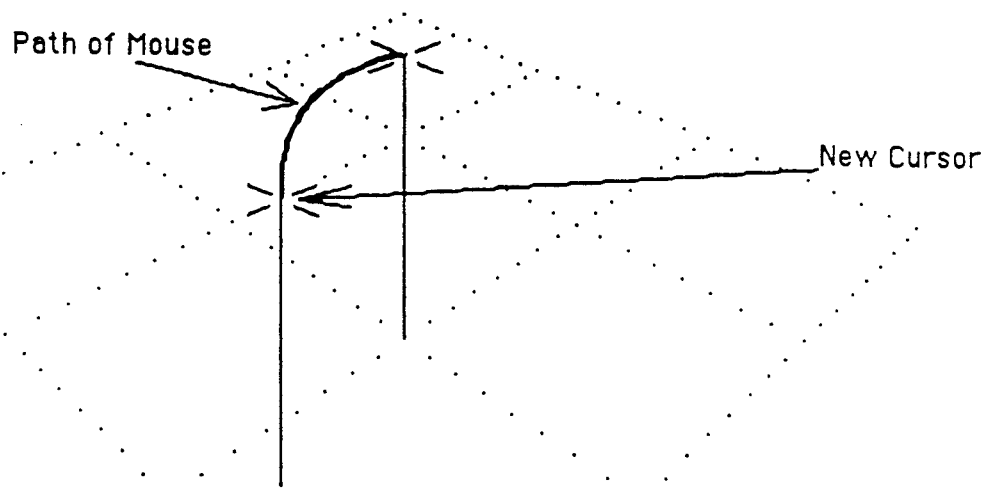
FIG. 6 illustrates the first point computation.
Figure 7:
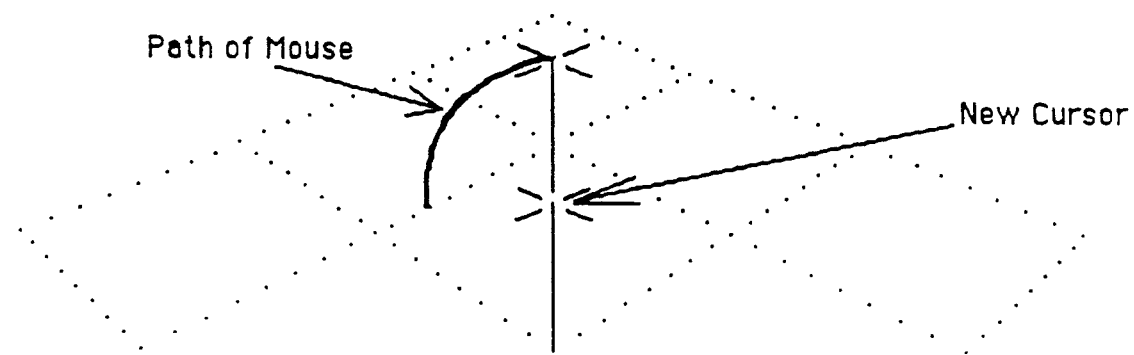
FIG. 7 illustrates the second point computation.

If 70% of the mouse points are within the corridor, the next step of the process is to specify two points in three space which could alternatively correspond to the new position of the cursor based on the path traveled by the mouse (see FIGS. 6 and 7). This process requires that a number of internal variables first be established: $(C_x, C_y, C_z)$ is the three dimensional value of the cursor's position; $(S_x, S_y)$ is the actual two dimensional position of the mouse in relation to the display; and "T" is a transformation which converts the three dimensional cursor position $(C_x, C_y, C_z)$ into a two dimensional mouse position $(S_x, S_y)$ in relation to the display. This transformation is illustrated in matrix form as follows:

$$(C_x C_y C_z 1)T = \begin{matrix} U_x \\ U_y \\ U_z \\ w \end{matrix}$$

where $$U_x = C_x T_{00} + C_y T_{10} + C_z T_{20} + T_{30}$$

$$U_y = C_x T_{01} + C_y T_{11} + C_z T_{21} + T_{31}$$

$$U_z = C_x T_{02} + C_y T_{12} + C_z T_{22} + T_{32}$$

$$w = C_x T_{03} + C_y T_{13} + C_z T_{23} + T_{33}$$

and the desired results are $$S_x = U_x/w$$

and $$S_y = U_y/w.$$

As previously mentioned, there are two alternative methods for solving the three dimensional value of the cursor's position. In the first method, an elevation is assumed, so $C_x$ and $C_y$ are held constant and a new $C_z$ is computed. There are two ways to solve for $C_z$ in such a situation, depending on which way prevents a divide-by-zero. One way begins with:

$$C_x T_{00} + C_y T_{10} + C_z T_{20} + T_{30} = S_x(C_x T_{03} + C_y T_{13} + C_z T_{23} + T_{33})$$

which becomes:

$$C_z = \frac{S_x(C_x T_{03} + C_y T_{13} + T_{33}) - C_x T_{00} - C_y T_{10} - T_{30}}{T_{20} - S_x T_{23}}$$

The other way begins with:
$$C_x T_{01} + C_y T_{11} + C_z T_{21} + T_{31} = S_y(C_x T_{03} + C_y T_{13} + C_z T_{23} + T_{33})$$

which becomes:

$$C_z = \frac{S_y(C_x T_{03} + C_y T_{13} + T_{33}) - C_x T_{01} - C_y T_{11} - T_{31}}{T_{21} - S_y T_{23}}$$

In the second method, an elevation is not assumed, so $C_z$ is held constant and a new $C_x$ and $C_y$ are computed. This method begins by solving for $C_x$ in two different ways, using the above two identities:

$$C_x T_{00} + C_y T_{10} + C_z T_{20} + T_{30} = S_x(C_x T_{03} + C_y T_{13} + C_z T_{23} + T_{33})$$

$$C_x T_{01} + C_y T_{11} + C_z T_{21} + T_{31} = S_y(C_x T_{03} + C_y T_{13} + C_{23} + T_{33})$$

These reduce to:

$$C_x = \frac{S_x(C_y T_{13} + C_z T_{23} + T_{33}) - C_y T_{10} - C_z T_{20} - T_{30}}{T_{00} - S_x T_{03}}$$

and $$C_x = \frac{S_y(C_y T_{13} + C_z T_{23} + T_{33}) - C_y T_{11} - C_z T_{21} - T_{31}}{T_{01} - S_y T_{03}}$$

Equating these two gives the following value for $C_y$:

$$\frac{(T_{00} - S_x T_{03})(S_y C_z T_{23} + S_y T_{33} - C_z T_{21} - T_{31}) - (T_{01} - S_y T_{03})(S_x C_z T_{23} + S_x T_{33} - C_z T_{20} - T_{30})}{(S_x T_3 - T_{10})(T_{01} - S_y T_{03}) - (S_y T_{13} - T_{11})(T_{00} - S_x T_{03})}$$

$C_x$ is then determined using either of the above two equations for $C_x$, again depending on which manner prevents a divide-by-zero.

Once these three dimensional values have been established for the cursor's projected three space position, the two alternatives are compared. If the distance that the cursor would follow presuming an elevation is more that twice the distance that it would follow presuming no elevation, then the elevation is discounted, block 42, and the system again returns to block 36. Otherwise, the mouse advance is considered to be an elevation, so ELEVATING is set to TRUE, block 44, and EC is incremented, block 46. If it turns out that this is the first elevation after a run of non-elevations (if EC is zero), then elevation is not done, block 48. This boundary condition prevents spurious elevations by demanding that at least two positive elevation determinations be found in a row before the state is properly initiated (further stickiness). If at least two elevations have occurred in a row, the cursor is elevated, block 50, before terminating for this mouse advance at STOP, block 52.

Although the present invention has been described with reference to FIG. 1 and with emphasis on a particular embodiment, it should be understood that the figure and the method described in this specification are for illustration of a preferred embodiment of the present invention described herein only and should not be taken as strict limitations upon the scope of the invention. For example, the two alternative three dimensional points determined in block 42 could have just as easily been determined at another point in the process, such as a part of block 24. It is contemplated that many changes and modifications may be made by persons of ordinary skill in the art to the steps, elements, process, and arrangement of elements or steps of the invention without departing from the spirit and scope of the invention as disclosed above.

I claim:

1. A computer implemented method for controlling a cursor to move in a three dimensional representation on a two dimensional display with a two-dimensional control device of a computer system in communication with the display, the control device being operative to generate a two-dimensional coordinate on the display for a control position of the control device in response to a manipulation of the control device by a user, comprising the steps of;

generating a translation signal by said computer system to said display when said manipulation of said control device is determined to correspond to a movement of said cursor in a two-dimensional plane within said three dimensional representation and generating an elevation signal by said computer system to said display when said manipulation of said control device is determined to correspond to a movement of said cursor in a direction perpendicular to said two-dimensional plane within said three dimensional representation;

moving said cursor within said two-dimensional plane formed by a first axis and a second axis in said three dimensional representation in response to said translation signal; and moving said cursor along a third axis perpendicular to said two-dimensional plane of said three dimensional representation in response to said elevation signal, wherein said step of generating includes the steps of determining whether said movement of said cursor would follow a first two dimensional path on said display within a predetermined threshold angle with said third axis in response to said manipulation of said control device;

determining whether said first path would stay within a predefined two dimensional corridor defining a straight line path for said cursor; and if said first path would be within said threshold angle and within said predefined two dimensional corridor, then plotting where a first point would be located on said display within said three dimensional representation formed by said first, second and third axes based on said two dimensional coordinate and an assumption that said movement of said cursor is an elevation of said cursor along said third axis.

plotting where a second point would be located on said display within said three dimensional representation based on said two dimensional coordinate and an assumption that said movement of said cursor is a translation of said cursor within said two-dimensional plane, generating said translation signal if a first distance from a present three dimensional position of said cursor to said first point is more than twice as large as a second distance from said present three dimensional position to said second point, and generating said elevation signal if said first distance is less than or equal to said second distance.

2. A computer implemented method for controlling a cursor as recited in claim 1, wherein said step of determining whether said movement of said cursor would follow said first path includes the steps of:

plotting where a two dimensional cursor point would be located on said display within said two dimensional plane formed by said first axis and said second axis based on said two dimensional coordinate;

determining said first path by determining where a line would be projected on said display within said two dimensional plane between at least a present two dimensional position of said cursor as defined by said first axis and said second axis and said cursor point;

determining a path angle between said third axis and said first path; and comparing said path angle to said threshold angle.

3. A computer implemented method for controlling a cursor as recited in claim 2, wherein said threshold angle is within a predetermined number of degrees of a shadow line extending from said present two dimensional position of said cursor and a ground plane, said ground plane being substantially parallel to said two-dimensional plane and having an elevation value of substantially zero along said third axis.

4. A computer implemented method for controlling a cursor as recited in claim 1, wherein said third axis is perpendicular to said two-dimensional plane and said threshold angle is within fifteen degrees of said third axis.

5. A computer implemented method for controlling a cursor as recited in claim 2, wherein said step of generating further includes the steps of:

determining whether said cursor had elevated or translated to obtain at least said present three dimensional position; and making generation of said elevation signal less likely than generating said translation signal if said cursor had previously translated to obtain at least said present three dimensional position.

6. A computer implemented method for controlling a cursor as recited in claim 5, wherein said step of making generation of said elevation signal less likely than generating said translation signal includes the steps of:

determining whether said present three dimensional position was obtained as a result of a continuous series of manipulations of said control device;

if said present three dimensional position was obtained as a result of said continuous series, saving said two dimensional coordinate and a time at which said manipulation occurred on a list in a memory of said computer system;

determining whether said list contains at least a predetermined number of said two dimensional coordinate and said time; and if said list contains less than said predetermined number of said two dimensional coordinate and said time, generating said translation signal instead of said elevation signal.

7. A computer implemented method for controlling a cursor as recited in claim 6, wherein said step of generating further includes the step of:

making generation of said translation signal less likely than generating said elevation signal if said cursor had previously elevated to obtain at least said present three dimensional position.

8. A computer implemented method for controlling a cursor as recited in claim 6, wherein said step of determining whether said first path would stay within said predefined two-dimensional corridor includes the steps of:

plotting where two dimensional cursor points corresponding to said sets from said list would be located on said display within said two dimensional plane formed by said first axis and said second axis to form said first path, said first path having a length;

setting the width of said predefined two-dimensional corridor as a predetermined percentage of said length;

counting how many of said two dimensional cursor points of said first path would be plotted outside of said predefined two-dimensional corridor; and determining that said first path is within said predefined two-dimensional corridor if a predetermined percentage of said two dimensional cursor points fall within said predefined two-dimensional corridor.

9. A computer implemented method for controlling a cursor as recited in claim 5, wherein said step of making generation of said translation signal less likely than generating said elevation signal includes the steps of:

determining whether said present three dimensional position was obtained as a result of a continuous series of manipulations of said control device;

if said present three dimensional position was obtained as a result of said continuous series, saving said two dimensional coordinate and a time at which said manipulation occurred on a list in a memory of said computer system;

determining whether said list contains at least a predetermined number of said two dimensional coordinate and said time; and if said list contains less than said predetermined number of said and said time, generating said elevation signal instead of said translation signal.

10. A computer implemented method for controlling a cursor as recited in claim 1, wherein said step of generating further includes the steps of:

determining whether said cursor had elevated or translated to obtain at least said present three dimensional position; and making generation of said elevation signal less likely than generating said translation signal if said cursor had previously translated to obtain at least said present three dimensional position.

11. A computer implemented method for controlling a cursor as recited in claim 10, wherein said step of making generation of said elevation signal less likely than generating said translation signal includes the steps of:

determining whether said present three dimensional position was obtained as a result of a continuous series of manipulations of said control device;

if said present three dimensional position was obtained as a result of said continuous series, saving said two dimensional coordinate and a time at which said manipulation occurred on a list in a memory of said computer system;

determining whether said list contains at least a predetermined number of said two dimensional coordinate and said time; and if said list contains less than said predetermined number of said two dimensional coordinate and said time, generating said translation signal instead of said elevation signal.

12. A computer implemented method for controlling a cursor as recited in claim 11, wherein said step of generating further includes the step of:

making generation of said translation signal less likely than generating said elevation signal if said cursor had previously elevated to obtain at least said present three dimensional position.

13. A computer implemented method for controlling a cursor as recited in claim 11, wherein said step of determining whether said first path would stay within said predefined two-dimensional corridor includes the steps of:

plotting where two dimensional cursor points corresponding to said sets from said list would be located on said display within said two dimensional plane formed by said first axis and said second axis to form said first path, said first path having a length;

setting the width of said predefined two-dimensional corridor as a predetermined percentage of said length;

counting how many of said two dimensional cursor points of said first path would be plotted outside of said predefined two-dimensional corridor; and determining that said first path is within said predefined two-dimensional corridor if a predetermined percentage of said two dimensional cursor points fall within said predefined two-dimensional corridor.

* * * * *